United States Patent [19]

Boutin et al.

[11] Patent Number: 5,076,940
[45] Date of Patent: Dec. 31, 1991

[54] BASIC ALUMINUM CHLOROSULFATE FLOCCULATING PROCESS

[75] Inventors: Jean Boutin, Mions; Andre Combet, Lyons; Jean-Pierre Communal, La Varenne Saint Hilaire, all of France

[73] Assignee: Rhone-Poulenc Chimie de Base, Courbevoie, France

[21] Appl. No.: 592,380

[22] Filed: Oct. 3, 1990

Related U.S. Application Data

[62] Division of Ser. No. 242,608, Sep. 8, 1988, Pat. No. 4,981,673, which is a division of Ser. No. 884,964, Jul. 14, 1986, abandoned.

[30] Foreign Application Priority Data

Jul. 12, 1985 [FR] France ............................ 85 10708
Jun. 23, 1986 [FR] France ............................ 86 09005
Jun. 23, 1986 [FR] France ............................ 86 09006

[51] Int. Cl.⁵ ............................................. C02F 1/52
[52] U.S. Cl. ....................................... 210/716; 210/723
[58] Field of Search ..................... 210/716, 717, 773; 423/467, 556; 252/175

[56] References Cited

U.S. PATENT DOCUMENTS 2,312,198 2/1943 Slagle ........................................ 23/50
3,929,666 12/1975 Aiba et al. ............................. 210/716
4,582,627 4/1986 Carlsson ................................ 210/723
4,654,201 3/1987 Carlsson ................................ 423/128
4,826,606 5/1989 Becker et al. ......................... 210/728

FOREIGN PATENT DOCUMENTS 0218487 4/1987 European Pat. Off. .
2547695 10/1974 Fed. Rep. of Germany .
2559143 8/1985 France .
50998/1973 7/1971 Japan .

Primary Examiner—Thomas Wyse
Attorney, Agent, or Firm—Burns, Doane, Swecker & Mathis

[57] ABSTRACT

A novel basic aluminum chlorosulfate, well adopted for the improved purification of aqueous media, has the formula

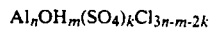

$$Al_nOH_m(SO_4)_kCl_{3n-m-2k}$$

and characteristic basicity, Al/Cl ratio, molecular weight and hydrodynamic diameters.

10 Claims, No Drawings

BASIC ALUMINUM CHLOROSULFATE FLOCCULATING PROCESS

This application is a divisional, of application Ser. No. 242,608, filed Sept. 8, 1988, now U.S. Pat. No. 4,981,673 which is a divisional of application Ser. No. 884,964 filed July 14, 1986 abandoned.

BACKGROUND OF THE INVENTION

1. Field of the Invention

The present invention relates to a novel basic aluminum chlorosulfate, a process for the preparation thereof and its use as a coagulating or flocculating agent for the treatment of aqueous media.

2. Description of the Prior Art

A wide variety of coagulating agents suitable for use in the treatment of effluents, residual waters or waste waters are known to this art. Ferrous chloride, ferric chloride, ferrous sulfate, ferric sulfate and ferric chlorosulfate are representative.

More especially representative are the aluminum sulfates, and specifically basic aluminum chlorosulfates.

The latter compounds are indeed effective. Nonetheless, more recently a demand has arisen for materials which leave lesser and lesser amounts of aluminum residues in the treated waters. Furthermore, the search continues for more versatile and flexible such materials.

SUMMARY OF THE INVENTION

Accordingly, a major object of the present invention is the provision of a novel basic aluminum chlorosulfate well adopted as an improved coagulating agent for the treatment of aqueous media, and whereby the residual aluminum content of the treated waters is maintained quite low.

This invention also provides a facile process for the preparation of the title compounds, and provides for the production of basic aluminum chlorosulfates adopted to form sludges having high coefficients of cohesion.

Also provided hereby are certain solutions of basic aluminum chlorosulfates which are both colorless and only slightly turbid.

Briefly, the present invention features novel basic aluminum chlorosulfates having the following general formula $$Al_nOH_m(SO_4)_kCl_{3n-m-2k}$$

wherein the basicity thereof, or the ratio $m/3n \times 100$, ranges from about 40% to about 65%, the ratio of Al equivalent/Cl equivalent ranges from 2.8 to 5, and the apparent molecular weight MA, measured by conventional light diffusion, and the apparent hydrodynamic diameters $\phi Z$ and $\phi W$ thereof, measured by the quasi-elastic diffusion of light, are as follows:

MA = 7000 to 35000

$\phi Z$ (Å) = 350 to 2500

$\phi W$ (Å) = 200 to 1200

The basic aluminum chlorosulfate according to the invention is also characterized by the process for the preparation thereof. A basic aluminum chlorosulfate comprising material having the general formula:

$$Al_nOH_m(SO_4)_kCl_{3n-m-2k}$$

is conveniently prepared by (i) slurrying calcium chloride with calcium carbonate (chlorocarbonate slurry), (ii) contacting the chlorocarbonate slurry with aluminum sulfate, and (iii) separating the mixture of reaction into a calcium sulfate cake and a filtrate which comprises said basic aluminum chlorosulfate, wherein the amounts of the chlorocarbonate slurry and the aluminum sulfate are such that a ratio $m/3n \times 100$ ranging from about 40% to 65% is provided in the resultant basic aluminum chlorosulfate, as is an Al equivalent/Cl equivalent ratio of from 2.8 to 5.

DETAILED DESCRIPTION OF THE PREFERRED EMBODIMENTS OF THE INVENTION

More particularly according to the present invention, the subject process for the preparation of basic aluminum chlorosulfate comprises (i) a stage of producing a calcium chloride and calcium carbonate slurry (chlorocarbonate slurry), (ii) a stage of contacting the chlorocarbonate slurry with aluminum sulfate, followed by (iii) a stage of separating the reaction mixture thus obtained, whereby a calcium sulfate cake and a filtrate containing the basic aluminum chlorosulfate are provided.

In the following description, this process shall be identified as the "general" process for the production of a basic aluminum chlorosulfate according to the invention.

The basic aluminum chlorosulfate of this invention as been defined hereinabove.

Its basicity advantageously ranges from 40 to 60%, nd more particularly from 45 to 56%. The chlorosulfate according the invention also has an Al equivalent/Cl equivalent ranging from 2.8 to 5, and more particularly 3.2 to 4. Finally, it is advantageous that the chlorosulfate of the invention have a proportion of desulfation (the proportion representing the ratio of the amount of sulfate eliminated to that initially present in the starting material aluminum sulfate) ranging from 70 to 90%, preferably from 70 to 85% and more particularly from 75 to 82%.

These three parameters, i.e., basicity, Al/Cl ratio as defined above and the degree of desulfation, and corresponding to the values given above, impart excellent stability to the chlorosulfate of the invention. This stability is manifested by the time in storage of the chlorosulfate in the absence of any precipitation; in the present case, such stability may extend to several months at ambient temperature.

The chlorosulfate of the invention also has a high apparent molecular weight ranging from 7000 to 35,000 and more particularly from 22,000 to 32,000. This weight is determined by conventional light diffusion on a basic aluminum chlorosulfate according to the invention, in an aqueous solution having an $Al_2O_3$ concentration of 8.3% by weight. The weight determination is measured immediately after the preparation of the sample by the process of the invention. The measurement is carried out using medium intensities diffused at an angle of 90°.

The hydrodynamic diameters of the chlorosulfates are measured by the quasi-elastic diffusion of light using an identical $Al_2O_3$ concentration.

The chlorosulfates according to the invention may have hydrodynamic diameters for $\phi W$ weights, expressed in Angstroms, of from 200 to 1200, more particularly from 800 to 1100. As regards the hydrodynamic diameters on the order of $\phi Z$, expressed in Angstroms, these may range from 350 to 2500, more particularly from 1500 to 2200.

Lastly, NMR measurements for monomeric aluminum content evidenced that 15 to 25% of the aluminum is in monomeric form in the basic aluminum chlorosulfate of the invention, the remainder of the aluminum being in polymer form.

The chlorosulfates according to the invention may be characterized in an equivalent and alternative manner by their average molecular weight $\overline{M}_w$ and their average real hydrodynamic diameters $\phi Z$ and $\phi W$.

These values are measured in conventional manner, by extrapolating to zero concentration, the curves respectively representing the reciprocal of the apparent molecular weight MA and the reciprocal of the apparent hydrodynamic diameters as a function of the concentration of the polymerized fraction of the basic aluminum chlorosulfate studied. The correspondence between the average real value and the apparent value of the molecular weight is given by the Debye equation:

$$1/\overline{M}_w = 1/Ma + Bc$$

wherein c is the concentration of the basic aluminum chlorosulfate solution and B a constant (virial coefficient).

In the same fashion, the interpretation of the correllograms (see, for example, Pusey, *Photon Correlation and Light Beating Spectroscopy*, page 387, Plenum Press (1973), makes it possible to determine for each concentration, the apparent hydrodynamic diameters $\phi Z$ and $\phi W$, and, by extrapolation to zero concentration, the average real diameters.

Advantageously, as the diluent for the preparation of samples of different concentration, the supernatant liquid is used which is obtained by the extended ultracentrifugation of solutions of the basic aluminum chlorosulfates of the present invention. This supernatant is completely compatible with polymer solutions and, as a practical matter, no longer diffuses light.

The correspondence between the system of real values and the system of apparent values given above enables characterization of the chlorosulfates of the invention by an average molecular weight of from 10,000 to 30,000 and more particularly from 19,000 to 30,000. Similarly, the real average hydrodynamic diameters on the order of $\phi Z$ range from 90 to 450 Å and more particularly from 100 to 150 Å, and those on the order of $\phi W$ range from 50 to 300 Å, more particularly from 60 to 80 Å.

The process for the preparation of the chlorosulfates according to the invention will now be more fully described.

In a first stage, a slurry is prepared from a mixture of calcium carbonate and calcium chloride. The amount of calcium chloride is determined as a function of basicity and the extent of desulfation determined for the final product.

This slurry is subsequently contacted with aluminum sulfate, typically in the form of an aqueous solution thereof. In general, a solution having 8.3% by weight of $Al_2O_3$ is used.

The addition of the slurry is carried out over a period of time varying typically ranging from 50 min to 4 hr. The addition is regulated such as to limit to the maximum the carbon dioxide foam which is formed during the reaction.

The reaction mixture is agitated (nonshearing agitation) and maintained at a temperature typically ranging from 35° C. to 50° C. A higher temperature may initiate parasitic reactions. A lower temperature may cause difficulties during the subsequent filtration. In one particular embodiment of the invention, following the addition of all of the calcium chloride and calcium carbonate, an aging and cooling stage of the reaction medium is advantageously carried out.

In this case, the reaction mixture is allowed to cool to a temperature that usually ranges from 5° C. to 20° C. During the aging, the mixture is maintained under nonshearing agitation.

The aging period typically extends from 45 min to 3 hr.

It may also be desirable to extend the aging stage by a further stage wherein the temperature of the reaction mixture is maintained, for example, at from 5° C. to 20° C. This temperature may be maintained for 15 min to 1 hr, for example.

Following the reaction and the optional aging and cooling stage, the reaction medium is separated. The separation may be carried out by any known means, in articular by filtering, centrifugation, draining or decantation. Preferably, filtration is used. It may also be advantageous to use a filter under pressure.

After filtration, a cake essentially consisting of calcium sulfate and a filtrate constituting the end production and containing the basic aluminum chlorosulfate according to the invention, are recovered.

The chlorosulfate product may be advantageously used for the treatment of an aqueous medium, such as, for example, drinking water, industrial feed water or waste waters.

In this case, the final product is added to the aqueous medium in variable proportions, as a function of the water to be treated.

In such an application, the product of the invention makes it possible to realize a particularly low amount of residual aluminum in the medium treated. Furthermore, while it is generally necessary with the prior art materials to treat aqueous media at pH values less than 8 to provide an acceptable amount of residual aluminum, this is not necessary with the final product of the present invention. This makes the use thereof much more flexible.

It has also been determined that the novel basic aluminum chlorosulfates of the invention have improved properties, in particular concerning the coefficient of cohesion of slurries contained in aqueous media treated with the subject chlorosulfates.

It is known that the principal devices intended for the treatment of aqueous media consist of gravity clarifiers based on the principle of sedimentation, i.e., the elimination of materials suspended in the water by gravity decantation.

The setting basin thus contains, at its base, a bed of sludge and, as the supernatant liquid, a clarified liquid effluent which is removed by overflow.

However, in view of the operating and production conditions of this type of installation, large scale variations in the speed of intake of the water to be treated in the settling facilities may be noted.

This has the effect of disturbing the decantation, and in certain cases to adversely affect the quality of the water decanted, if the coefficients of cohesion of the resultant sludges are inadequate.

It is now understood that these variations within a given installation are acceptable, only if the solidity of the bed of sludge in the settling zone is sufficient.

Stated differently, with a given cohesion of the sludge bed, the higher the speed of the overflow desired, the less sedimentation will take place under acceptable conditions.

To resolve this problem, provided hereby is an improvement in the manufacturing process described above, characterized in that the chlorocarbonate slurry is reacted continuously with the aluminum sulfate.

It has now been discovered that such an improved process enables production of materials which, quite unexpectedly and surprisingly, form sludges having significantly improved coefficients of cohesion.

This embodiment differs essentially from the process described above by its continuous nature.

By "continuous process" is intended that the flow of the starting materials (chlorocarbonate and aluminum sulfate slurry), the nature of the intermediates in the course of conversion (aluminum sulfate under basification) and the final products withdrawn (aluminum sulfate having the desired basicity, admixed with the gypsum formed) are in steady state.

The contacting of the chlorocarbonate slurry with the aluminum sulfate may be carried out in a single phase.

However, in a preferred embodiment of the invention, the basification of the aluminum sulfate is effected in at least two successive phases by reacting the chlorocarbonate slurry with the aluminum sulfate, under conditions such that the basicity of the aluminum chlorosulfate present in the reaction medium existing after each basification phase, increases from the first to the last phase.

In actual practice, the successive basification reactions of the aluminum sulfate take place in at least two reactors placed in series.

The number of reactors is theoretically unlimited, but is controlled by economics. Advantageously, two reactors are used.

In another preferred embodiment of the invention, in the first phase all of the aluminum sulfate is reacted with a first fraction of the chlorocarbonate slurry, whereupon the remaining fractions of the chlorocarbonate slurry are successively reacted with the reaction medium issuing from each of the preceding phases, whereby, in the last phase, the aluminum chlorosulfate of the desired basicity is obtained.

Thus, in actual practice, an initial solution of $Al_2(SO_4)_3$ is continuously charged into the first reactor alone, into which the chlorocarbonate slurry is also introduced; this reaction medium then serves as feed for the second reactor, into which the chlorocarbonate slurry is again introduced in a manner such as to increase the basicity of the aluminum chlorosulfate contained in the reaction medium issuing from the first reactor, and the operation is repeated in all of the successive reactors such that the aluminum chlorosulfate having the desired basicity is recovered from the last reactor.

In another embodiment of the invention, the principal flow of the chlorocarbonate slurry is divided into n fractions which are distributed in parallel over the n reactors, such that the average basicity of the aluminum chlorosulfate present in the reaction medium successively issuing from each reactor progressively increases, up to the final basicity desired at the outlet of the last reactor.

Generally, the operation is carried out in a fashion such that the basicity of the aluminum chlorosulfate present in the reaction medium emanating from the first reactor ranges from 15 to 35%.

The basification reactors are moderately agitated (nonshearing agitation) to maintain the homogeneity of the reaction medium.

The reactors are maintained at a temperature generally ranging from 35° C. to 50° C.

As in the case of the general process, the reaction medium exiting the last reactor may be subjected, prior to separation by filtration, to an aging and cooling stage.

The basic aluminum chlorosulfate solutions provided hereby have improved properties, in particular relative to their coloration and turbidity.

In effect the basic aluminum chlorosulfate obtained after the filtration of the reaction medium may have, in certain cases, a color extending from a very deep brown to yellow, and, on the other hand, a turbidity greatly exceeding one hundred NTU units.

This turbidity, which may be redhibitory, is due to a particularly high proportion of solids in suspension, in particular relative to gypsum fines which pass through the filter during the filtration stage, and it is conceivable that the strong coloration of the product solutions is caused by colorant impurities based in particular on iron or humic substances, with the nature and amount of these colorant impurities certainly varying as a function of the quality of the starting materials.

The present improvement thus features a process for the preparation of basic aluminum chlorosulfate solutions, both colorless and having low turbidity, the latter being less than about ten NTU units.

For this purpose, an improvement in the general processes set forth above is provided, said improvement being characterized in that, in at least one of the aforementioned stages or phases, together or separately, at least one adsorbing agent and at least one flocculating polyelectrolyte, either nonionic or cationic, are added.

Consistent with such improvement, final products are obtained that are, surprisingly, both colorless and clear.

The improvement is thus characterized in that an adsorbant and a nonionic or cationic flocculating polyelectrolyte are used.

Exemplary of the adsorbants suitable for use according to the present invention, particularly representative are activated carbon, activated alumina, alumino-silicates, silica gels, magnesia and clay.

The adsorbants described above may be used either alone or in combination.

In a preferred embodiment of the invention, activated carbon is used.

The adsorbant may be introduced at any level in the production of the subject basic aluminum chlorosulfate, but always prior to the separation stage, in particular filtration.

It is found, however, that it is particularly advantageous to introduce it during the stage of the preparation of the chlorocarbonate slurry. The most effective decoloration was observed in this case.

The amount of the adsorbing agent to be introduced is not critical and may vary over wide limits, depending upon the desired final quality of the product.

In the particular case wherein activated carbon is used, usually an amount of from 0.5 to 10 kg thereof, is employed per ton of the aluminum sulfate to be basified. This amount preferably ranges from 1 and 5 kg of active carbon/ton of aluminum sulfate.

The polyelectrolytes suitable for use according to the present invention typically are high molecular weight polymers, said molecular weights generally being greater than one or several millions.

As regards polyelectrolytes of the nonionic type, particularly representative are the polyacrylamides, polyethylene oxides, polyvinylpyrrolidones and polyvinyl alcohols.

Preferably, the polyacrylamides are used.

Representative polyelectrolytes of the cationic type suitable for use in the present invention are, in particular:

(i) Neutral polyamines and quaternary polyamines. More particularly, the polyalkyleneamines and neutral or quaternary polyhydroxyalkyleneamines are exemplary For example, the following homopolymers are especially suitable: polyethyleneamine, 2-hydroxy-1-propyl-N-methylammonium polychloride, 2-hydroxy-1-propyl-1,N-dimethylammonium polychloride, 2-vinylimidazolinium polyhydrogenosulfate and diallyl-dimethyl-ammonium polychloride. The copolymer formed from acrylamide and diallyl-dimethyl-ammonium chloride is also suitable;

(ii) Polyaminoacrylates and polyaminomethacrylates and more precisely polydialkylaminoalkylacrylates and polydialkylaminoalkylmethacrylates. As an example, neutral or quaternary poly-N,N-dimethylaminoethyl-methacrylate is very suitable, both in the homopolymer form or as a copolymer with acrylamide;

(iii) Polyaminoacrylamides and polyaminomethacrylamides, and more precisely polydialkylaminoalkyl acrylamides or methacrylamides. As examples, poly-N-dimethylaminopropylmethacrylamides and poly-N-dimethylaminomethylacrylamides are representative.

It will be appreciated that this list of polyelectrolytes is exemplary only and not intended as limiting. All of the polyelectrolytes, taken individually or in admixture, with the exception of the anionic type well known to this art, are in effect suitable for use in the present invention.

However, a polyelectrolyte of the nonionic type is preferably used, as it has been noted that same lead to better results, even if used in smaller amounts.

As was the case with the adsorbing agents, the polyelectrolyte may be introduced during any of the stages for the production of the basic aluminum chlorosulfate, but always prior to the separation stage, in particular filtration.

However, in another preferred embodiment of the invention, the flocculating polyelectrolyte is introduced into the reaction mixture obtained after the contacting of the chlorocarbonate slurry with the aluminum sulfate, immediately prior to the separation stage, in particular the filtration.

In an even more preferred embodiment of the invention, the flocculating polyelectrolyte is advantageously introduced into said reaction medium after an aging stage, such as that described under the general process.

The amount of the flocculating agent to be introduced depends upon the quality desired of the final basic aluminum chlorosulfate solution. However, it was unexpectedly and surprisingly discovered that, in all cases, particularly low amounts of the flocculating agents provide the desired results.

In actual practice, amounts ranging from 1 to 100 g of polyelectrolytes per ton of the reaction medium are used, i.e., per ton of the mixture obtained after contacting the chlorocarbonate slurry and the aluminum sulfate to be basified (mixture of basic aluminum chlorosulfate and gypsum).

After introducing the adsorbant and the flocculating polyelectrolyte, as defined in the description above, and filtering the reaction medium, a clear and colorless basic aluminum chlorosulfate (turbidity may be less than 10 NTU) solution is obtained.

Furthermore, aluminum yields appreciably higher than those obtained by the general process, are observed.

The aluminum yield is defined as the weight ratio of the aluminum present in the form of basic aluminum chlorosulfate (final product) and the amount of the aluminum introduced in the form of aluminum sulfate.

In order to further illustrate the present invention and the advantages thereof, the following specific examples are given, it being understood that same are intended only as illustrative and in nowise limitative.

EXAMPLE 1

This examples illustrates the general process for the preparation of a basic aluminum chlorosulfate (P) according to the invention.

(a) First, a slurry having the following composition was prepared:

(i) $CaCl_1$ 122 g
(ii) $CaCO_3$ 184 g

This slurry was gradually added to 1500 g of aluminum sulfate having a concentration of 8.3% $Al_2O_3$ and 0.32% OH—. The mixture was agitated and heated to 40° C. The slurry was added over a time period of one hour, with the temperature being maintained at 40° C.

The reaction mixture was agitated under nonshearing agitation for one hour and permitted to cool to 20° C. The mixture was then maintained at this temperature for ½ hour. It was then filtered under a vacuum of 400 mm Hg. The filter cake was washed with 200 g of industrial water. 1295 g of product were recovered, titering 8.65% $Al_2O_3$ and having a density of 1.16 and a pH of 2.6. The titer in $Al_2O_3$ was adjusted to 8.3% with water.

The final product chlorosulfate had the following formula:

$$Al_2OH_{3.28}Cl_{1.72}(SO_4)_{0.5}$$

Its basicity was 54.7%.
Extent of desulfation: 83%.
Proportion of polymerization by NMR = 85%.
Al equivalent/Cl equivalent ratio: 3.5.
It had the following other properties:
Apparent molecular weight with 8.3% $Al_2O_3$: 24,000

| | |
|---|---|
| ⌀Z (Å), 8.3% $Al_2O_3$: | 1,850 |
| ⌀W (Å), 8.3% $Al_2O_3$: | 950 |

(b) Determination of average molecular weight and real hydrodynamic diameters corresponding to the product chlorosulfate:

(1) Apparatus used
BECKMAN L8-55 ultracentrifuge equipped with a Ti 60 rotor:

measurement of the increment of the $v$ index by a BRICE PHOENIX differential refractometer set at the green radiation of mercury ($\lambda = 546$ nm);

measurements of correlation and diffused intensities by a MALVERN goniometer, a MALVERN 253 4×4 bits channels, and an argon laser ionized Spectraphysic model 165, capable of yielding approximately 1.5 Watt in green radiation ($\lambda = 514.5$ nm), (2) Mode of operation:

The basic aluminum chlorosulfate solution obtained by the process described under (a) was treated in the centrifuge for 1 hr at 10,000 rpm, such as to provide a clear and colorless solution The diluent wa obtained by centrifugation for 100 hr at 55,000 rpm. Following centrifugation, a gelatinous polymer residue was observed at the base of the tube and the supernatant liquid diffused at an intensity in the 90° direction less than 0.5 times the intensity diffused by a benzene standard Subsequently, samples of different concentrations were prepared by dilution with the supernatant liquid to carry out the light diffusion study. Each sample was first clarified by centrifugation for 1 hr at 10,000 rpm.

(3) Results:
(i) $v$ Index increment: 0.0947 cm3/g
(ii) Average molecular weight obtained by extrapolation to zero concentration: 26,400,
(iii) Real average hydrodynamic diameters extrapolated to zero concentration:

$\phi Z = 100$ Å

$\phi W = 65$ Å

COMPARATIVE EXAMPLE 2

This example illustrates a process for the preparation of basic aluminum chlorosulfate ($P_1$) according to the prior art.

(a) the material of the prior art was prepared by acid attack on alumina using a mixture of $HCl + H_2SO_4$. The mixture was neutralized until a molar ratio OH/Al of 1.4 was obtained and was filtered to eliminate the gypsum.

A final product having the formula $Al_2OH_{2.8}CL_{2.6}(SO_4)_{0.3}$ was produced. The Al equivalent/Cl equivalent ratio was 2.3.

Apparent molecular weight with 8.3% $Al_2O_3$: 2,900

$\phi Z$ (Å) : 144

$\phi W$ (Å) : 85

Proportion of polymer by NMR = 75%.

The product had an $Al_2O_3$ concentration of 10%.

(b) Determination of $\overline{M}_w$ and corresponding real average diameters:

The procedure was as in Example 1(b), except for preparation of the diluent.

After 100 hr of centrifugation at 55,000 rpm, separation occurred into two phases having different viscosities. The phase with the lower viscosity was separated and again subjected to centrifugation, for 60 hr at 55,000 rpm. The phase obtained via this second centrifugation was used as the diluent.

The results were as follows:
(i) $v$ Index increment: 0.109 cm3/g
(ii) Average molecular weight, by weight: 3,600
(iii) Average real diameters:

$\phi Z = 45$ Å

$\phi W = 20$ Å

EXAMPLE 3

This example illustrates the use of the chlorosulfate of the invention for the treatment of water.

The product (P) of the invention obtained according to Example 1 was compared with a product of the prior art ($P_1$) obtained by Comparative Example 2.

Jar-test experiments were carried out according to the following mode of operation:
2 Liter beaker
Ambient temperature
River Water
Jar test
(i) regulation of the pH by the addition of HCl or NaOH;
(ii) rapid agitation for 3 min after the addition of concentrated coagulant;
slow agitation for 20 min;
settling for 15 min;
withdrawal of 400 ml;
analyses -pH;
- aluminum (atomic absorption) (HEWLETT PACKARD apparatus);
filtration - Nucleopore filter of 0.4 μm and determination of the aluminum The water temperature was 18.3° C.; pH = 7.8
Hydrometric titer = 20° French (a) In a first series of experiments, the amount of the product used was varied. The results are reported in Table I. The amounts of the products P or $P_1$ varied from 5 to 27 g of the solution with 8.3% or 10% $Al_2O_3$, respectively, per m3 of water treated.

TABLE I

| Treatment dose | Aluminum (ppb in water filtered 0.4 μm) | |
|---|---|---|
| | $P_1$ | P (of invention) |
| 5 g/M3 | 110 | 80 |
| 10 g/M3 | 130 | 90 |
| 17 g/M3 | 150 | 100 |
| 27 g/M3 | 170 | 100 |

(b) Second series of experiments

With the same amount of treatment with $Al_2O_3$ (1.5 g/m3), the pH was varied from 7.1 to 8.45 by the addition of HCl or NaOH.

The results are reported in Table II.

TABLE II

| pH of water treated | Aluminum (ppb) in water filtered 0.4 μm | |
|---|---|---|
| | $P_1$ | P (of invention) |
| 7.1 | 55 | 40 |
| 7.55 | 70 | 50 |
| 8 | 140 | 90 |
| 8.45 | 270 | 130 |

Generally, the standard of residual aluminum was set at 200 ppb. It is therefore apparent that, with the chlorosulfate of the prior art, it is necessary to use a pH preferably less than 8, while with the chlorosulfate of the invention, with a pH of 8.45, values are obtained which are still significantly below the standard.

EXAMPLE 4 the amount of chlorocarbonate slurry necessary to provide the final theoretical basicity desired.

TABLE III

| Samples | Final theoretical basicity desired | Corresponding desulfation extent | Actual basicity (%) | Al₂O₃ content by weight | Slurry chlorocarbonate kg | |
|---|---|---|---|---|---|---|
| | | | | | Discontinuous method | Continuous method - 2 stages |
| A | 52 | 77.5 | 52.2 | 8.89 | 0.558 | |
| B | 55 | 82 | 55.2 | 8.55 | 0.590 | |
| C | 58 | 86.5 | 58.4 | 8.36 | 0.622 | |
| D | 52 | 77.5 | 51.6 | 8.41 | | 0.325 then 0.233 |
| E | 55 | 82 | 54.9 | 8.16 | | 0.325 then 0.265 |
| F | 58 | 86.5 | 58.2 | 8.62 | | 0.325 then 0.297 |

This examples illustrates the improvement provided by a process that is continuous, relative to the cohesion coefficient of the sludges.

(1) Preparation of the Samples:

(a) Common operating conditions:

The basicification reactors were agitated moderately using anchors such as to maintain the homogeneity of the resulting slurry. These reactors were maintained at a temperature of 40° C. by a water bath during the basification period.

The final slurry was then aged at 35°-40° C. for 2 hr and cooled to 20° C. over 1 hr. The slurry was then filtered under vacuum on a polyester foil (vacuum of 700 mm Hg). The gypsum cake was washed with the same amount of water in all of the experiments; the solution resulting from the wash was recovered in the first filtrate.

Finally, all of the products obtained were adjusted to a titer of 8.3% Al₂O₃ in order to conduct the cohesion coefficient test of the sludges.

(b) Preparation of the chlorocarbonate slurry:

To 1 kg water, 0.739 kg anhydrous CaCl₂ was added under agitation until complete dissolution, and after dissolution, 1.281 kg of ground chalk were added having an average grain size of about 10 microns. After 2 hr of agitation, a slurry was obtained, the weight of which was adjusted to 3,020 kg.

This slurry was maintained under agitation at 40° C. It was used as the basification and desulfation reagent in the preparation of the basic aluminum chlorosulfate samples.

(c) Subsequently, chlorosulfates of different final compositions were prepared discontinuously (samples A, B and C) and continuously (D, E and F) by the addition of appropriate amounts of chlorocarbonate slurry with 2 kg aluminum sulfate at 8.2% Al₂O₃ by weight and a basicity of 3% (OH/3 Al×100).

The amounts of the reagents and the composition of the final products are reported in Table III.

In the case of the discontinuous method, the amounts of the chlorocarbonate slurry were introduced over 2 hr into the aluminum sulfate.

In the case of the continuous method, one was limited for purely practical reasons to a two stage continuous process.

In a first 3 liter reactor, over a period of 1 hr, all of the aluminum sulfate and 0.325 kg of the chlorocarbonate slurry were continuously and proportionally introduced in a manner such that the theoretical basicity of the aluminum sulfate exiting the reactor was approximately 30%.

The product which exited the first reactor was introduced into a second reactor having the characteristics of the first reactor, together with and proportional to the amount of chlorocarbonate slurry necessary to provide the final theoretical basicity desired.

(2) Performance of the chlorosulfates relative to the cohesion coefficient of the sludges:

(a) Test used

The operating method described in *Technical Handbook of Water*, published by DEGREMONT in 1978, pages 951-952 was used.

A 250 ml test tube was used into which the sludge collected in the different beakers during the flocculation test was introduced, each beaker having received the same amounts of the reagents.

The test tube was permitted to stand for 10 min. The excess of sludge introduced was then siphoned off as to leave an apparent volume of approximately 50 ml in the specimen.

Water was permitted to penetrate through the bottom of the test tube, with the water necessarily being the water decanted during the preceding flocculation experiment.

This had the effect of expanding the ludge and the ascending rates of the water corresponding to the different states of the expansion of the ludge were measured.

The time T (in seconds) corresponding to the introduction of 100 ml water for the apparent volumes V ml of the sludge equal to: 100 - 125 - 150 - 175 - 200 ml was measured. To calculate the velocity v, if Å is the height in mm of the test tube corresponding to 100 ml (the distance between the 100 and 200 ml mark on the 250 ml test tube), v is equal to (3.6 A)/T meter per hour.

The results are displayed graphically by plotting v on the ordinate and V on the abcissa, these two values being related by the equation:

$$v = K\left(\frac{V}{V_o} - 1\right)$$

wherein:

V: the apparent volume of the sludge in expansion;

v: the ascending velocity in the test tube to obtain a volume V;

Vo: the volume of the tapped sludge at zero velocity and measured on the curve.

The coefficient K is designated the cohesion coefficient of the sludge and corresponds to the ascending velocity in the test tube necessary to obtain a double expansion of the initial volume of the sludge.

(b) Measurements:

The water treated was a water coarsely filtered on sand, originating from the river Oise.

Its temperature was 24° C.

Its pH was 8 and its turbidity 1.4 NTU.

The proportion of organic matter in mg of $O_2/l$ was (determined by the permanganate in acid medium method).

Flocculation was obtained by adding 20 ppm of the A to F sample products under the following conditions:
(i) 3 min rapid agitation (180 rpm)
(ii) 15 min slow agitation (50 rpm).
(iii) 20 min settling.

The DEGREMONT test of the sludges formed provided the results reported in Table IV.

TABLE IV

| Samples | Discontinuous | | | Continuous - 2 stages | | |
|---|---|---|---|---|---|---|
| | A | B | C | D | E | F |
| Cohesion coefficient of sludge K | 0.82 | 0.85 | 0.80 | 0.96 | 0.090 | 1.02 |

These results clearly show the appreciable improvement in the cohesion coefficients of the sludges obtained by flocculation with the basic aluminum chlorosulfates obtained by the continuous method in several stages, in particular with products of high basicity.

EXAMPLE 5

This example illustrates the improvement provided by the general process relative to the coloration and turbidity of the products obtained.

(1) Experiment 1

This experiment illustrates the process for the preparation of a basic aluminum chlorosulfate according to the general process.

292.6 g of an industrial chalk marketed under the trademark "CALCITEC 2000" by the CPC Co., were attacked with 241.2 g HCl, 33% by weight.

The sludge obtained in this manner was added gradually to 1500 g aluminum sulfate containing 8.3% $Al_2O_3$ and 0.32% OH—.

The slurry was added over a period of one hour under moderate agitation, at a temperature of 40° C.

The reaction medium obtained in this manner (basic aluminum chlorosulfate+gypsum) was maintained under nonshearing agitation at 40° C. for one hour.

The reaction medium was then permitted to cool to 20° C. over 2 hr, continuously under agitation.

The mixture was filtered under vacuum (400 mm Hg). The gypsum cake was thereby separated from the filtrate. The cake was washed with water such as to recover a basic aluminum chlorosulfate solution containing 8.3% $Al_2O_3$ and having a basicity of 54.6% and a degree of desulfation of 84%.

The aluminum yield was 88%.

It was determined that the solution obtained was very turbid, having a turbidity well over 100 NTU and highly colored, with a deep brown color.

(2) Experiments 2 to 5

The process followed was that of Experiment 1, but in addition:

(a) during the stage of the preparation of the chlorocarbonate slurry, 5.4 g activated carbon were added, which corresponded to 3.6 kg activated carbon per ton of aluminum sulfate to be basified.

The active carbon used is marketed under the trademark "ACTICARBONE 2S" by the CECA Co.

(b) to the reaction medium obtained after contacting the chlorocarbonate slurry with the aluminum sulfate, a nonionic polyelectrolyte flocculant was added, polyacrylamide type (molecular weight more than $10^6$) and marketed under the trademark "FLOERGER 920 SH" by the FLOERGER Co.

The amount of the polyelectrolyte introduced was varied, said amount being expressed in g/ton of the reaction medium (basic aluminum chlorosulfate mixture +gypsum) The results are reported in Table V.

TABLE V

| No. of Experiment | Activated carbon kg/t aluminum sulfate | Polyelectrolyte g/t of reaction medium | Turbidity (NTU) | Coloration (visual) | Aluminum yield % |
|---|---|---|---|---|---|
| 2 | 3.6 | 0 | 40 | clear brown | 89.8 |
| 3 | 3.6 | 6 | 14 | colorless | 92 |
| 4 | 3.6 | 19 | 11 | colorless | 92.3 |
| 5 | 3.6 | 36 | 11 | colorless | 91.5 |

It was noted that very little of the flocculating agent sufficed (from 6 ppm) to provide an excellent result both in regard to coloration and to turbidity Furthermore, there was an appreciable improvement in the aluminum yield, amounting to a gain of 4% with respect to the product of Experiment 1.

(3) Experiments 6 to 10

These experiments illustrate the improved process according to the invention, using different polyelectrolytes.

The stages were carried out as in Exp. 2 to 5.

The materials used were the following:
HCL 33%: 246.5 g,
industrial chalk marketed under the trademark "STANDARD PR 2" by the BMP Co.: 298.3 g,
aluminum sulfate with 8.3% $Al_2O_3$ and 0.32% OH—: 1500 g,
activated carbon "ACTICARBONE 2S": 2.5 kg/t of aluminum sulfate.

The nature and amounts of the polyelectrolytes were varied.

The polyelectrolyte trademarked "FLOCOGIL" as marketed by the RHONE-POULENC Co.

"FLOCOGIL AD 10" was a nonionic polymer comprising 100% polyacrylamide

"FLOCOGIL C 1090" was a weekly cationic copolymer containing 90% polyacrylamide and 10% ethyl-trimethyl ammonium methacrylate polychloride.

"FLOCOGIL C 4" was a strongly cationic polymer comprising 100% ethyl-trimethyl ammonium methacrylate polychloride.

The results obtained are reported in Table VI.

It was noted that all of the polyelectrolytes provided, at least in excess of a certain minimum amount, colorless or practically colorless products with low turbidity. It was found, however, that polyelectrolytes of the nonionic type yielded results with the lowest amounts, which signified increased efficiency.

TABLE VI

| Experiment No. | Polyelectrolyte | Grams of polyelectrolyte per ton of reaction medium | Turbidity (NTU) | Coloration (visual) | Aluminum yield, % |
|---|---|---|---|---|---|
| 6 | none | 0 | much greater than 100 | deep brown | 72 |
| 7 | FLOEGER 920 SH | 37 | 20 | colorless | 72 |
| 8 | FLOCOGIL AD 10 | 49 | 35 | colorless | 76.9 |
| 9 | FLOCOGIL C1090 | 100 | 20 | practically colorless | 72.9 |
| 10 | FLOCOGIL C4 | 100 | 40 | practically colorless | 72.5 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A method for the treatment of impure aqueous media, comprising coagulating the impurities therefrom with a basic aluminum chlorosulfate of the formula:

$$Al_nOH_m(SO_4)_kCl_{3n-m-2k}$$

having a basicity, or ratio $m/3n \times 100$, of from about 40% to about 60%, and a ratio of Al equivalent /Cl equivalent, or ratio of $3n-3n-m-2k$, of from 2.8 to 5.

2. The method as defined by claim 1, wherein said basic aluminum chlorosulfate has the following apparent molecular weight and apparent hydrodynamic diameters:

$MA = 22,000$ to $32,000$;

$\phi Z = 1,500$ to $2,200$ Å;

$\phi W = 800$ to $1,100$ Å.

3. The method as defined by claim 1, wherein said basic aluminum chlorosulfate has the following average molecular weight $M_w$ and average real hydrodynamic diameters $\phi Z$ and $\phi W$:

$M_w = 10,000$ to $30,000$;

$\phi Z = 90$ to $450$ Å;

$\phi W = 50$ to $300$ Å.

4. The method as defined by claim 1, wherein said basic aluminum chlorosulfate has the following average molecular weight and average real hydrodynamic diameters:

$M_w = 19,000$ to $30,000$;

$\phi Z = 100$ to $150$ Å;

$\phi W = 60$ to $80$ Å.

5. The method as defined by claim 1, wherein said basic aluminum chlorosulfate has a basicity, or ratio $m/3n \times 100$, ranging from about 45% to about 56%.

6. The method as defined by claim 1, wherein said basic aluminum chlorosulfate has from 15 to 25% of the aluminum content thereof being in monomeric form.

7. The method as defined by claim 1, wherein said basic aluminum chlorosulfate comprises an aqueous filtrate.

8. The method as defined by claim 1, wherein said basic aluminum chlorosulfate has a ratio of Al equivalent/Cl equivalent ranging from above 3.2 to 5.

9. The method as defined by claim 1, wherein said basic aluminum chlorosulfate has an average molecular weight $M_w$ of at least 10,000.

10. The method as defined by claim 1, wherein said basic aluminum chlorosulfate has the following apparent molecular weight MA and apparent hydrodynamic diameters $\phi Z$ and $\phi W$:

$MA = 7,000$ to $35,000$;

$\phi Z = 350$ to $2,500$ Å;

$\phi W = 200$ to $1,200$ Å.

* * * * *